Sept. 6, 1927.
M. B. BREWSTER
1,641,528
QUICKLY DETACHABLE SEALING COUPLING
Filed Dec. 5, 1925
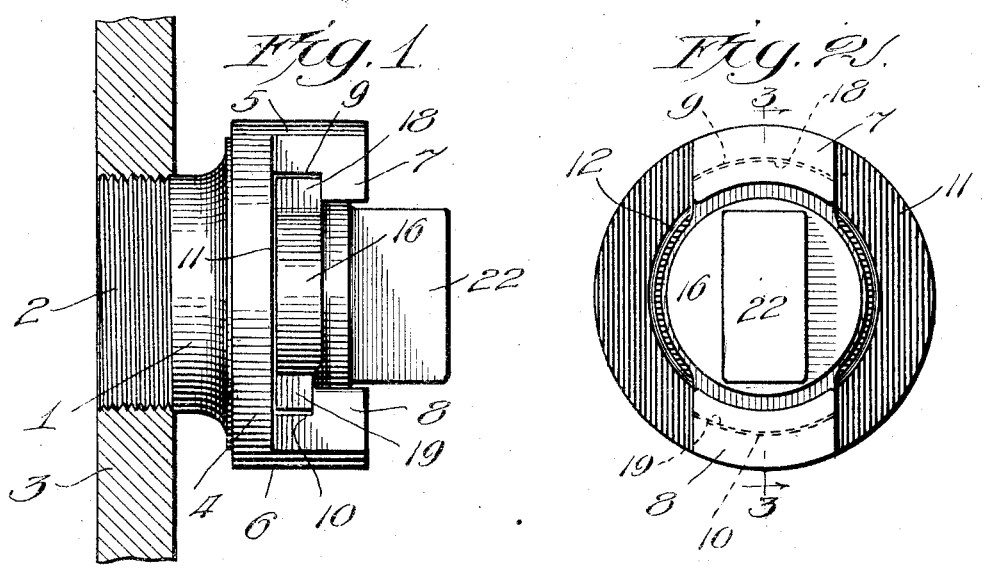
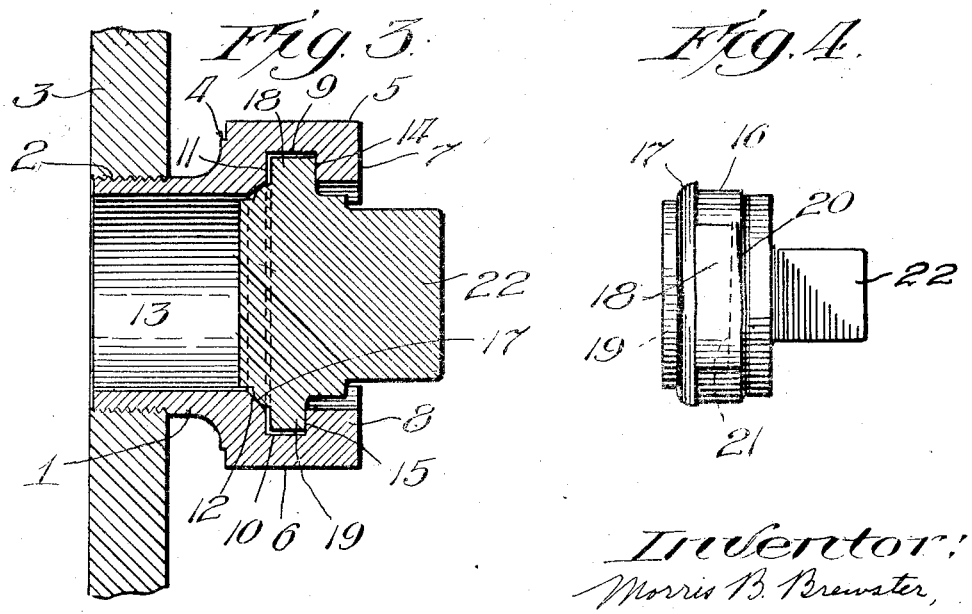
Inventor:
Morris B. Brewster Patented Sept. 6, 1927.

1,641,528

UNITED STATES PATENT OFFICE.

MORRIS B. BREWSTER, OF CHICAGO, ILLINOIS.

QUICKLY-DETACHABLE SEALING COUPLING.

Application filed December 5, 1925. Serial No. 73,308.

The present invention relates to means for securing together two parts to form a sealed joint between the same, so that they may be quickly connected together or separated from each other; and has for its object to simplify and improve such means in order to insure that the same surfaces will always be brought to bear upon each other when the parts are connected together, permit easy inspection of the bearing surfaces or faces and guard against poor contact on account of formation of scale or for other reasons.

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is a side elevation of a boiler plug or bung embodying the present invention, a supporting wall for the device being shown in section; Fig. 2 is an end view of the device; Fig. 3 is a section taken on line 3—3 of Fig. 2, showing also the supporting wall and Fig. 4 is a side view of one of the elements detached from the other.

In the drawings I have illustrated my invention as applied to a plug forming an inlet or outlet for a boiler or other member and, for the sake of brevity, the detailed description will be confined to this particular use; although it will of course be understood that the invention may be used for other purposes.

Referring to the drawing, 1 represents a hollow plug, open at the ends, screw-threaded at one end, as indicated at 2 for the purpose of securing the plug in an opening in a wall 3. The end of the plug on the outer side of the wall is enlarged in diameter, as indicated at 4. A pair of ears, 5 and 6, project outwardly from the enlarged portion of the plug, opposite each other and parallel with the longitudinal axis of the plug; the outer ends of the ears having radial flanges 7 and 8 directed inwardly toward said longitudinal axis, thereby providing grooves 9 and 10 between the same and the transverse face 11 of the part 4 that lies opposite the inner faces of the flanges. The plug is provided with a frusto-conical bearing seat 12 extending inwardly from the face 11 and surrounding the bore 13 in the plug. The face 11 may be a plane surface lying at right angles to the longitudinal axis of the plug, but the opposite faces 14 and 15 on the flanges 7 and 8 form parts of a helical surface surrounding the longitudinal axis of the plug. One of the grooves is therefore narrower than the other because the latter has one side formed by a rising portion of the helix. In the arrangement shown, the groove 10 is the narrow groove and the groove 9 is the wider one.

Cooperating with the plug is a complimentary member 16 having near one end an annular bearing face 17 that preferably forms part of a spherical surface, this bearing face being adapted to rest against the frusto-conical seat in the plug. The member 16 has two oppositely disposed lugs 18 and 19 projecting therefrom outwardly from the bearing face 17. The faces of these lugs on the side toward the bearing seat may be flat surfaces lying in a plane at right angles to the longitudinal axis of the member 16, but the opposite faces 20 and 21 form parts of a helical surface like that in which the helical faces of the grooves 9 and 10 lie.

The parts are so proportioned that when the member 16 is brought toward the plug, with the lugs lying transversely of a diameter passing through the ears 5 and 6, the bearing face 17 will engage with the conical seat. Then, by turning the member 16, the lugs will enter the grooves in the plug and pressure will be exerted on the member 16 in a direction to force the bearing faces tightly together.

It will be seen that, just as one of the grooves in the plug is narrower than the other, so one of the lugs on the member 16 is thinner than the other. Therefore the thin lug must always be entered into the narrow groove and the thicker lug into the wider groove; thus insuring that the same portions of the bearing faces will always be brought into contact with each other, no matter how frequently the parts are connected to and disconnected from each other. This is of considerable importance, as it is well known that when two annular bearing faces have once been brought into a condition such that there is a perfect contact which insures a tight joint, it is desirable that the two faces be always brought again into the same angular relation for, if one of the bearing faces were displaced through an angle of 180°, there might not be a perfect contact between the two faces.

Since the purpose of the member 16, as shown, is to close the outer end of the plug, the member 16, in the arrangement shown, is made solid, or at least imperforate.

The member 16 may be rotated in any suitable way to connect it to and disconnect it from the plug. In the arrangement shown, I have provided the member 16 with a rectangular lug 22 extending diametrically across the same on the side opposite that on which the bearing face is located. A wrench or other tool may be applied to the lug 22 to turn the member 16. When the two parts of my device have been coupled together the lug 22 extends diametrically between the ears 5 and 6 on the plug and thus constitutes an indicator to show that the coupling has been completed. In other words, if the lug 22 should at any time lie at a considerable angle to a diameter passing through the centers of the ears 5 and 6, the person responsible for the condition of the coupling or connection would be apprised of the fact that the same had not been completed.

When the member 16 is removed from the plug, the frusto-conical seat 12 is exposed to view and, if it should need grinding, this can easily be done. Where the device is used on a steam boiler, for example, no scale formation that can take place will interfere with the tightness of the joint, because the scale will all be formed inwardly of the joint and, when the member 16 is removed, can easily be cleaned off without mutilating or even touching the annular line that makes the actual contact with the closing device.

The peculiar construction of the grooves in the plug and of the lugs on the cooperating member, in addition to affording the advantages already enumerated, simplifies the manufacture of the device, because the wedging faces in the grooves may be cut by a simple thread-cutting tool, as may also the wedge faces on the lugs. In other words, the cutting of the wedge faces on each member is performed as a single continuous operation and without requiring the tool to be shifted or the adjustment of the work to be changed, as would be the case if the wedge faces were not parts of a single helical surface.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

In combination, a member having an opening therethrough and an outwardly-facing bearing seat at one end of said opening, elements projecting outwardly from said member at said end beside and spaced apart from said seat, and having undercut grooves on their inner sides, a second member having a bearing face adapted to rest on said seat and having laterally-projecting lugs adapted to enter said grooves when said members are turned relatively to each other while the bearing face on the one rests against the seat on the other, the lugs and the grooves being shaped to produce a wedging action tending to force the second member toward said seat, and the parts being so proportioned and arranged that each lug is compelled to enter the same groove whenever the members are connected together.

In testimony whereof, I sign this specification.

MORRIS B. BREWSTER.